April 15, 1941.  W. E. MERRIMAN  2,238,497
SOUND CAMERA
Filed Oct. 14, 1939   2 Sheets-Sheet 1
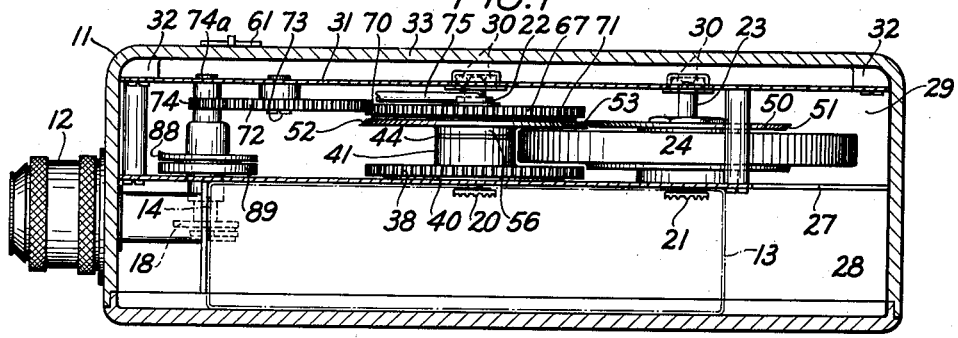
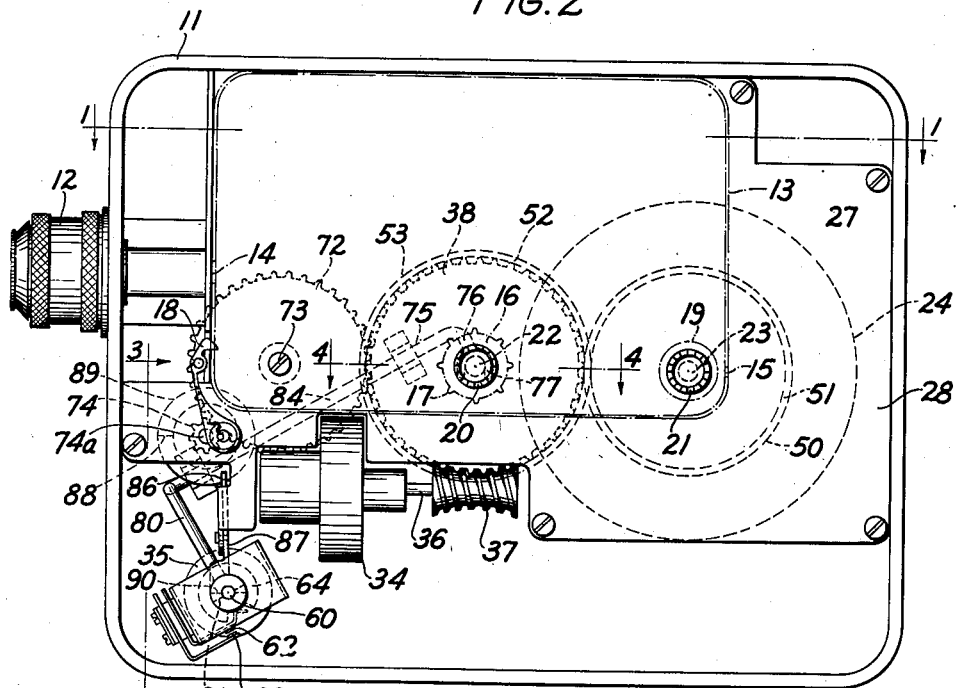
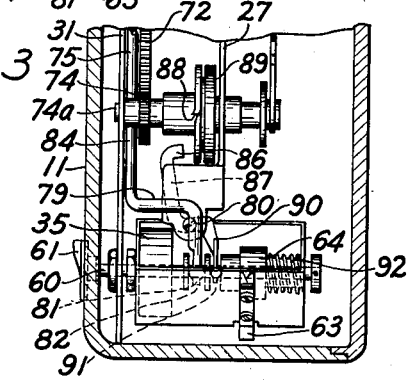
WILLIAM E. MERRIMAN
INVENTOR
BY
ATTORNEYS April 15, 1941.  W. E. MERRIMAN  2,238,497
SOUND CAMERA
Filed Oct. 14, 1939  2 Sheets-Sheet 2
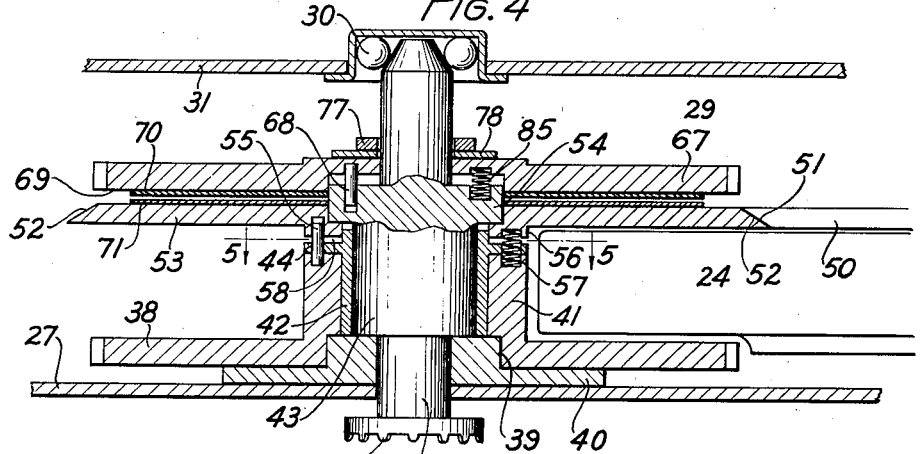
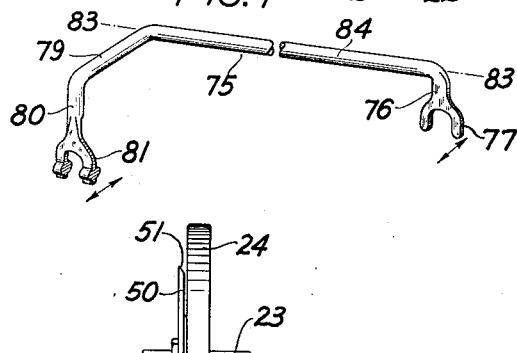
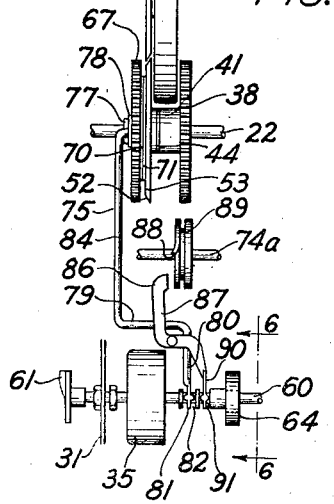
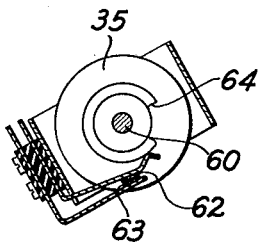
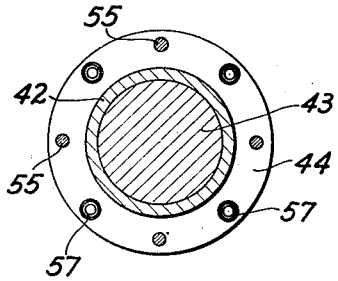
WILLIAM E. MERRIMAN
INVENTOR
BY
ATTORNEYS Patented Apr. 15, 1941

2,238,497

UNITED STATES PATENT OFFICE 2,238,497

SOUND CAMERA

William E. Merriman, Rochester, N. Y., assignor to Eastman Kodak Company, Rochester, N. Y., a corporation of New Jersey Application October 14, 1939, Serial No. 299,555

15 Claims. (Cl. 271—2.3)

The present invention relates to photographic cameras, and more particularly to sound recording motion picture cameras in which the sound and picture apertures are arranged at spaced points along the film travel. At the sound aperture, the film strip passes over a sound drum which is driven at a uniform speed by the moving film strip.

In order to secure true reproductions on a film strip of the sound being recorded, it is highly essential that the film strip be moved at a substantially constant and uniform lineal speed past the sound recording aperture. To secure such speed control, it is common practice to mount a flywheel or some similar form of speed control member on the sound drum shaft. It is also important that the film strip at the scanning point or sound aperture reach a uniform speed before sound recording is commenced. Any attempt to record sound when the film strip is being brought up to running speed will produce a distorted and false sound record, as is well known to those in the art. The portion of the film strip containing such a distorted sound record must obviously be destroyed, thus resulting in a loss of sensitized film.

It has been found that this undesirable effect can be overcome by initially connecting the sound drum shaft, with its control member, to the drive means so as to first bring the sound drum shaft up to its operating or running speed. During this speeding up operation, the film feed mechanism is disconnected from the drive means so that the film strip is not moving through the film magazine. Then when the sound drum shaft has obtained its proper speed, it is disconnected from the drive means and the latter is simultaneously connected to the feed mechanism to feed the film strip through the film magazine. Thus the sound drum is at running speed when recording is started and a true sound reproduction is secured.

One object of the invention is the provision in a camera of this class of an arrangement for initially connecting the sound drum shaft to the drive means to bring the shaft up to running speed, and for then disconnecting the shaft therefrom. Thereafter, the sound drum is driven solely by the moving film strip.

Another object of the invention is the provision of an arrangement for disconnecting the sound drum shaft from the drive means after the shaft has been brought up to speed, and to simultaneously connect the film feed mechanism to the drive means.

A further object of the invention is the provision of an arrangement by which the disconnecting of the sound drum shaft from and the connecting of the film feed mechanism to the drive means is controlled from the main motor switch.

A still further object of the invention is the provision of an arrangement by which the rotation of the main switch serves to energize the electrical motor of the drive mechanism and to bring the sound drum shaft up to speed, while a sliding movement of the switch disconnects the sound drum shaft from, and connects the film feed mechanism to, the motor drive.

Still another object of the invention is the provision of a stopping means which effectively arrests rotation of the film feeding mechanism upon disengagement of the latter from the drive means to prevent coasting of the film strip.

Yet another object of the invention is the provision of a control means of the class described which is simple in construction, relatively inexpensive to manufacture, and highly effective in use.

To these and other ends, the invention resides in certain improvements and combinations of parts all as will be hereinafter more fully described, the novel features being pointed out in the claims at the end of the specification.

In the drawings:

Fig. 1 is a horizontal sectional view through a motion picture camera of the sound type, taken substantially on lines 1—1 of Fig. 2 showing the relation of the various camera parts;

Fig. 2 is a side elevation view of the camera illustrated in Fig. 1 with the side plate removed, showing the arrangement of the various film feed members;

Fig. 3 is a vertical sectional view through a portion of the camera illustrated in Fig. 2 taken substantially on lines 3—3 thereof, showing the arrangement of the motor control or starting switch and the relation of the shifting mechanism thereto;

Fig. 4 is an enlarged horizontal sectional view of a portion of the mechanism illustrated in Fig. 2 but on a larger scale than the latter, and taken substantially on lines 4—4 thereof, showing the arrangement for connecting the sound drum shaft to the drive means and for simultaneously disconnecting it from, and connecting the film feed mechanism thereto;

Fig. 5 is a vertical sectional view of a portion of the mechanism illustrated in Fig. 4, and taken substantially on lines 5—5 thereof, showing the connecting means between certain parts of the drive mechanism;

Fig. 6 is an end view of the motor control switch, taken substantially on lines 6—6 of Fig. 8, showing the arrangement for closing the motor contact from the motor switch;

Fig. 7 is a perspective view of the control lever which connects the motor switch to the film feed shaft; and Fig. 8 is an end elevation view of the mechanism by which the sound drum shaft is initially brought up to speed and is then disconnected from the drive means, while the film feed mechanism is simultaneously connected thereto.

Similar reference numerals throughout the various views indicate the same parts.

Figs. 1 and 2 of the drawings show a sound camera having a housing or body portion 11 on the front of which the camera objective lens 12 is mounted. A film magazine, generally indicated by the numeral 13, is placeable within the camera housing and contains a supply of sensitized film which is intermittently fed past the picture exposing aperture 14 to record the picture, and is then continuously fed past the sound aperture 15 to record the sound image on the marginal edge of the film strip, all of which is well known to those in the art. A definite length of film is maintained between the picture and sound apertures so as to maintain the proper synchronism between the picture taking and the sound recording, as is well known.

The film magazine 13 contains a supply of film which is drawn from a supply roll by a constantly driven feed sprocket 16, the teeth 17 of which engage the marginal perforations of the film strip to feed the latter through the magazine. A suitable pull-down claw 18, to be later described, intermittently feeds the film past the picture aperture 14. The feed sprocket 16 is positioned within and supported by the magazine 13. The latter also carries a sound drum 19 which is positioned in alignment with the sound aperture 15. The feed sprocket 16 and sound drum 19 are both formed with axially extending teeth members, not shown, which are arranged to engage complementary members 20 and 21 formed on the film feed and sound drum shafts 22 and 23 respectively when the magazine is in position in the camera.

By means of this arrangement, the sprocket 16 is disengageably connected in positive driving engagement with the feed shaft 22 while the sound drum 19 is similarly connected to the sound drum shaft 23. In normal operation, the sound drum shaft 23 is in no way connected with the film feeding or driving mechanism to be later described, but is driven solely by the movement of the film strip over the sound drum. However, when the camera is first started, a direct connection is provided between drive means and the sound drum shaft 23 to bring the latter up to running speed, after which the sound drum shaft is disconnected from the drive means, and is then driven solely by the moving film strip. In order to insure uniform speed, the sound drum shaft has mounted thereon a feed control member 24, preferably in the form of a viscous flywheel of the type embodied in the applicant's copending application Number 234,809, filed October 13, 1938, to which reference may be had for a detailed description.

The film feed and sound drum shafts 22 and 23 have the inner ends thereof journaled in a partition 27 which divides the interior of the camera housing into a magazine compartment 28 and a mechanism compartment 29. The other ends of the shafts are mounted in ball-bearings 30, see Fig. 4, suitably positioned on a plate 31 the ends of which are secured to bosses 32 formed on the side wall 33 of the housing 11. An electric motor 34 is mounted in the mechanism chamber 29 and is adapted to be energized by storage batteries, not shown, carried by the film magazine 13. A switch, generally indicated by the numeral 35, is connected into the motor circuit and, when closed, connects the batteries to the motor 34 to energize the latter. The motor shaft 36 has mounted thereon a worm 37 which meshes with a gear 38 rotatably mounted on a bearing 39 formed on a thrust plate 40 secured to or formed integral with the partition 27, as clearly shown in Fig. 4. A sleeve 41 is preferably formed integral with the gear 38 and is mounted on a bushing 42 loosely supported by an enlarged intermediate portion 43 of the shaft 22. A ring 44 on the bushing 42 cooperates with the plate 40 to maintain the gear 38 and the sleeve 41 in axial position on the shaft 22, as is apparent from an inspection of Fig. 4.

As mentioned above, the sound drum shaft 23 is preferably brought up to its running speed prior to the connecting of the film feed mechanism to the various drive members. To secure this result, the speed control member 24 has secured thereto or formed integral therewith a radially extending disk 50 the periphery of which is beveled, as shown at 51, to engage a similarly beveled edge 52 of a disk 53 loosely mounted on a hub 54 of the shaft 22, as shown in Fig. 4. The disk 53 is splined to the sleeve 41 so as to rotate therewith but movable axially relative to the shaft 22 for a purpose to be later described. This splined connection comprises, in the present embodiment, a plurality of axially extending pins 55 which connect the sleeve 41 to the hub portion 56 of the disk 53. A plurality of springs 57 are interposed between the hub 56 and the sleeve 41 and tend to move the disk 53 into driving engagement with the disk 50, as will be apparent from an inspection of Fig. 4. A slight space 58 is provided between the hub 56 of the disk 53 and the ring 44, the reason for which will be later pointed out. By means of the above arrangement, as shown in Fig. 4, the sound drum shaft 23, through the disks 50 and 53 and the gear 38, is directly connected to the motor 34 so as to be driven thereby to bring the sound drum shaft up to running speed.

When the camera is stopped, the parts are in the position shown in Fig. 4 in which the two disks 50 and 53 are in engagement. The circuit to the motor 34 is controlled through the main switch 35 which comprises a rotatably and axially slidable shaft 60 one end of which extends through the camera body and has mounted thereon an operating button 61, see Figs. 3 and 8. The switch is also provided with a pair of electrical contacts 62 and 63 arranged in the circuit of the motor 34. When these contacts are in engagement, as shown in Fig. 6, the circuit between the batteries and the motor 34 is closed and the motor is operated to drive the gear 38, and hence the sound drum shaft to bring the latter up to running speed. The closing of the contacts 62 and 63 of the circuit is affected by means of a cam 64 which, when the shaft 60 is rotated, engages the contact 62 to move the latter into engagement with the contact 63, as illustrated in Fig. 6. Thus the rotation of the shaft 60 of the switch 35 serves to energize the motor 34 and to bring the sound drum shaft up to running speed. At this point it is well to point out that due to the fact that the gear 38, sleeve 41, and disk 53 are all loosely mounted on the film feed shaft 22, the latter remains stationary during this initial speeding up operation. As the shaft 22 is not driven, obviously the film speed sprocket 16 is ineffective in moving the film strip through the machine so that the film is not fed during the time when the sound drum shaft is being speeded up.

After the sound drum shaft has been brought up to its proper speed, the latter is then disconnected from the drive means and the film feed shaft 22 is connected thereto to drive the latter and hence the film sprocket 16 and the pull-down claw 18 in a manner to be now described. To secure this result, a second gear 67 is splined on the shaft 22 adjacent the disk 53, see Fig. 4. The gear 67 is thus adapted to rotate as a unit with the shaft 22 but is slidable therealong for a purpose to be later described. This splined connection comprises a plurality of pins 68 engaging in registering holes in the gear 67 and the hub 54 of the shaft 22. These pins provide the sole driving connection between the gear 67 and the shaft 22. One face 69 of the gear 67 carries a friction plate 70 adapted to be brought into engagement with a complementary friction clutch plate 71 on the disk 53, see Fig. 4. It is now apparent that if the gear 67 is slid axially along the shaft 22 toward the disk 53 to bring the clutch members 70 and 71 into engagement, the gear 67 will be clutched to and driven by the disk 53 which, in turn, is driven by the motor 34 through the gear 38. Thus when the clutch members 70 and 71 are in engagement, the gear 67 is positively driven, to move the film feeding mechanism. When however, the clutch members 70 and 71 are out of engagement the gear 67 remains stationary and the film feeding mechanism becomes inoperative.

It is apparent from an inspection of Fig. 4 that after the clutch members 70 and 71 are engaged, a slight additional axial movement of the gear 67 will serve to shift the disk 53 axially a slight distance, by reason of the space 58, to disengage the latter from the disk 50 and the sound drum shaft to disconnect the latter from the drive means. The disks 50 and 53 thus provide a clutch between the drive means and the sound drum shaft. However, when the sound drum shaft is thus disconnected, the film feed shaft 22 is positively driven through the gear 67 thus operating the film sprocket 16 to move the film strip through the magazine 13. The gear 67 is also utilized to drive the film pull-down claw 18 through an intermediate gear 72 which meshes with the gear 67 and is rotatably mounted on a stud 73 on the plate 31, see Fig. 1. This gear 72 in turn engages the gear 74 on the pull-down shaft 74a to drive the latter. The pull-down shaft is journalled in the partition 27 and the plate 31, see Fig. 1. A portion of the shaft 74a extends into the magazine compartment 28 and carries the pull-down claw 18 as is apparent from an inspection of the drawings.

Thus when the gear 67 is slid axially to engage the clutch members 70 and 71, the film feed sprocket 16 is positively and continuously driven to feed the film through the magazine 13, and the pull-down claw 18 is actuated to intermittently move the film strip past the picture aperture 14. The axial movement of the gear 67 thus performs two operations. First, it brings the clutch members 70 and 71 into engagement and thus operatively connects the film feed mechanism to the drive means. Second, it simultaneously shifts the disk 53 axially to disengage the latter from the disk 50 to disconnect the sound drum shaft from the drive means. The film is now propelled through the camera by the film feed mechanism, the sound drum being driven solely by the moving film strip. The feed control member 24 then maintains a uniform sound drum speed so as to afford a true reproduction of the sound being recorded.

The above described movement of the gear 67 is controlled, in the present embodiment, by the control switch 35. By means of this arrangement, the rotation of the switch closes the contacts 62 and 63 to start the motor 34 and to bring the sound drum shaft up to speed. Then by an axial movement of the switch shaft 60, the gear 67 is moved to disengage the sound drum shaft from and to connect the film feed mechanism with the drive means. To secure this result, the present invention provides a lever 75 operatively connecting the gear 67 and the switch shaft 60. This lever is of the shape best shown in Fig. 7 and has one end 76 bent or offset and forked, as shown at 77, to fit around the shaft 22, as illustrated in Fig. 4. These forked or bifurcated portions 77, engage a plate 78 secured to or formed integral with the gear 67, as shown in Fig. 4. The other end of the lever 75 is bent to provide two offset portions 79 and 80 the latter of which is formed with spaced forked portions 81 which are adapted to engage a slot 82 in the switch shaft 60, as best shown in Figs. 3 and 8. It is apparent from an inspection of Fig. 7 that if the left end of the lever 75 is moved in the direction of the arrows, the lever will pivot about the axis 83—83 of the intermediate portion 84 to move the right end of the lever in the same direction. The lever 75 may thus be broadly considered as a bellcrank which is movable about the axis 83—83. With such an arrangement, when the button 61 is pushed inwardly or to the right, as viewed in Figs. 3 and 8, the portion 80 of the lever is thus moved to the right. Such movement rocks the lever 75 to also move the bifurcated ends 77 to the right thus similarly sliding the gear 67 to engage the clutch members 70 and 71. Thus by merely moving the switch shaft 60 inwardly, the sound drum shaft is disconnected from, and the film feed mechanism is connected to the drive means to feed the film strip through the camera.

Thus as long as the button 61 is pressed inwardly, the film strip is moved through the magazine 13 and pictures and sound records are recorded. However, when the button is released, the coil spring 92, see Fig. 3, acts on the switch shaft to move the latter outwardly or to the left. Such movement of the shaft 60 rocks the lever 75 in the opposite direction to move the bifurcated portion 77 thereof out of engagement with the gear 67. The coil springs 85 positioned intermediate the gear 67 and the hub 54 of the shaft 22 now serve to shift the gear 67 to the left, as viewed in Fig. 8, to disengage the clutch members 70 and 71. Such shifting returns the parts to the position shown in Fig. 4 in which the film feed mechanism is disconnected from the drive means, and the disk 53 is again moved into engagement with the disk 50 to maintain the sound drum shaft at running speed until the button 61 is again depressed to take pictures.

Thus the movement of the switch shaft 60 in one direction (rotated) serves to bring the sound drum shaft up to running speed, and a movement of the shaft 60 in another direction (inward) disconnects the sound drum shaft from and connects the film feed mechanism to the drive means. Thus the entire camera operation can be controlled from the switch 35.

When the button 61 is released, as mentioned above, the film feed mechanism is disconnected from the drive means. Due, however, to the inertia of the moving feed mechanism parts, the latter may tend to continue their movement or coast for a distance of several image areas after the button 61 has been released. It is highly desirable, however, to quickly arrest movement of film feed mechanism and hence the film strip upon release of the button 61, for reasons apparent to those in the art. To secure this result, a suitable stopping or braking device is automatically moved into operative position upon release of the control button 61. This stopping is secured, in the present embodiment, by moving one arm 86 of the bellcrank lever 87 into the path of a lug 88 formed on a stop disk 89 mounted on the pull-down shaft 74A. It is apparent from an inspection of Fig. 8 that when the lug 88 engages the arm 86, the pull-down shaft, and hence the film feed mechanism, is arrested to thus prevent coasting thereof.

In order that the engagement of this stopping means may become effective upon release of the button 61, it is preferably actuated from the switch shaft 60. The bellcrank 87 thus has the other arm 90 positioned to engage a slot 91 formed in the shaft 60 so that any axial movement of the latter serves to rock the bellcrank about its pivot. Thus as the button 61 is released, the shaft 60 moves outwardly to pivot the bellcrank in a clockwise direction, see Fig. 8, to move the other arm 86 into the path of the lug 88 to arrest further movement of the pull-down shaft and hence the film feeding mechanism substantially and simultaneously with the release of the button 61. When, however, the button 61 is pressed inwardly to connect the film feed mechanism with the drive means, as pointed out above, the arm 90 of the bellcrank is moved inwardly by the shaft 60, thus rocking the bellcrank 87 in a counterclockwise direction, as shown in Fig. 8, to move the arm 86 out of the path of the lug 88. Such movement occurs slightly in advance of the engagement of the clutch members 70 and 71. By means of this simple arrangement, any coasting of the film feed mechanism is effectively prevented, and the film strip is quickly brought to rest upon release of the control button 51.

It is thus apparent from the above description that the present invention provides an arrangement, controlled from the motor switch, to initially bring the sound drum shaft up to speed and subsequently disconnecting the sound drum shaft from and simultaneously connecting the film feeding mechanism to the drive means. Upon disengagement of the film feeding mechanism from the drive means, the sound drum shaft is again automatically connected thereto to maintain the sound drum shaft at proper running speed. In addition, such disengagement of the film feed mechanism simultaneously moves a blocking member into operative position to quickly arrest the movement of the film feeding mechanism to prevent coasting thereof.

While one embodiment of the invention has been disclosed, it is to be understood that the inventive idea may be carried out in a number of ways. This application is, therefore, not to be limited to the precise details disclosed but is intended to cover all variations and modifications thereof falling within the spirit of the invention or the scope of the appended claims.

I claim:

1. In a motion picture camera, the combination with a sound drum shaft, means for feeding a film strip through said camera and across the exposure aperture thereof, drive means for said feeding means, of means for initially connecting said shaft to said drive means to bring said shaft up to speed, and means for then disconnecting said shaft from said drive means and for simultaneously connecting said feed means thereto.

2. In a motion picture camera, the combination with a sound drum shaft, means for feeding a film strip through said camera and across the exposure aperture thereof, drive means for said feeding means, of means for disengageably connecting said drive means to said feed means, means for initially connecting said shaft to said drive means to bring said shaft up to speed, and means for simultaneously disconnecting said shaft from said drive means and for connecting said feed means thereto.

3. In a motion picture camera, the combination with a sound drum shaft, means for feeding a film strip through said camera and across the exposure aperture thereof, drive means for said feeding means, of a clutch for disengageably connecting said drive means to said feed means, means for connecting said shaft to said drive means prior to the engagement of said clutch to bring said shaft up to speed, means for engaging said clutch to operatively connect said drive means to said feed means, and means for disconnecting said shaft from said drive means upon engagement of said clutch.

4. In a motion picture camera, the combination with a sound drum shaft, means for feeding a film strip through said camera and across the exposure aperture thereof, drive means for said feeding means, of control means for said drive means, means for operatively connecting said shaft to said drive means upon actuation of said control means to bring said shaft up to speed, and means for simultaneously disconnecting said shaft from said drive means and for connecting said feed means thereto.

5. In a motion picture camera, the combination with a sound drum shaft, means for feeding a film strip through said camera and across the exposure aperture thereof, drive means for said feeding means, of control means for said drive means, means for operatively connecting said sound shaft to said drive means to bring said shaft up to speed, a clutch for operatively connecting said feed means to said drive means, and means actuated by said control means for engaging said clutch to connect said drive and feed means and for simultaneously disconnecting said shaft from said drive means.

6. In a motion picture camera, the combination with a sound drum shaft, means for feeding a film strip through said camera and across the exposure aperture thereof, drive means for said feeding means, of a control member movable in one direction to start said drive means, means for operatively connecting said sound shaft to said drive means to bring said shaft up to speed, means for disengageably connecting said feed means to said drive means, and means connecting said last means to said control means so that the movement of the latter in another direction serves to actuate said disengageable means to connect said feed means to said drive means and to simultaneously disconnect the latter from said drum shaft.

7. In a motion picture camera, the combination with a sound drum shaft, a film feed shaft, of drive means including a member loosely mounted on said feed shaft, control means for said drive means, means for connecting said drum shaft to said loosely mounted member to drive said drum shaft therefrom to bring the latter up to speed when said drive means is operated, film feeding means comprising a member splined on said shaft and disengageably connectable to said loosely mounted member, said members being disconnected when said drum shaft is driven from said drive means, and means for connecting said members to operate said feed means from said drive means and to disconnect said drive shaft from said drive means.

8. In a motion picture camera, the combination with a sound drum shaft, a film feed shaft, of a sleeve loosely mounted on said feed shaft, a gear carried by said sleeve, drive means operatively connected to said gear to drive the latter, a member splined to said sleeve, starting means for said drive means, means connecting said member in driving relation to said drum shaft to bring the latter up to speed, film feeding means including a second gear splined on said shaft adjacent said member, a clutch for connecting said member to said second gear, and a lever connecting said second gear to said starting means whereby the latter may be actuated to engage said clutch to connect said drive means to said feed means and to simultaneously disconnect said member from said sound drum shaft.

9. In a motion picture camera, the combination with a sound drum shaft, a film feed shaft, of a speed control member carried by said sound shaft, a radially extending disk on said control member, a gear loosely mounted on said feed shaft, drive means connected to said gear, a control member operatively connected to said drive means and movable in one direction to start the latter, a second disk loosely mounted on said feed shaft and adapted to engage said first disk to rotate said drum shaft to bring the latter up to speed when said drive means is started, means for splining said second disk to said gear, a second gear splined on said shaft adjacent said second disk, cooperating clutch members on said second disk and second gear to connect the latter in driven relation with said drive means, film feed means operated by said second gear, and a lever connecting said control member with said second gear so that the movement of said control member in another direction serves to move said second disk and said second gear axially along said shaft to engage said clutch to connect said feed means to said drive means and to simultaneously disengage said disks to disconnect said speed control member and said sound drum shaft from said drive means.

10. In a motion picture camera, the combination with a sound drum shaft, a rotary speed control member carried by said shaft, a film feed shaft, a pull down shaft, of a radially extending disk carried by and rotatable with said control member, a gear loosely mounted on said feed shaft, drive means connected to said gear to positively drive the latter, a control member operatively connected to said drive means and movable in one direction to start the latter, a second disk loosely mounted on said feed shaft and adapted to engage said first disk to rotate said control member to bring the latter and said drum shaft up to speed, said second disk being loosely mounted and axially movable on said feed shaft, means for connecting said second disk in driving engagement with said gear, a second gear splined on said shaft adjacent said second disk, cooperating clutch members on said second disk and said second gear to connect the latter in driven relation with said drive means, film feed means operated by said second gear for moving a film strip through said camera and across the exposure aperture thereof, a stop disk carried by said pull down shaft, means for connecting said pull down shaft to said film feed means, a lever connecting said second gear to said control member so that movement of the latter in another direction slides said second gear along said feed shaft to engage said clutch and to also move said second disk axially along said shaft to disconnect said disks to disengage said drum shaft from said drive means, and means actuated by said control member for engaging said stop disk to lock said pull down shaft, said last means being movable out of locking engagement with said pull down shaft when said control member is moved in said another direction.

11. In a motion picture camera, the combination with a sound drum shaft, a rotary speed control member on said drum shaft, a film feed shaft, a pull down shaft operatively connected to and driven from said feed shaft, of a sleeve member loosely mounted on said feed shaft, a gear carried by said sleeve member, an electric motor connected to said gear to positively drive the latter, a radially extending disk carried by said speed control member, a second disk loosely mounted on said feed shaft and adapted to be axially moved therealong and into driving engagement with said first disk to rotate the latter to bring said speed control member and said drum shaft up to speed, means for connecting said second disk to said gear, spring means interposed between said gear and said disk and tending to urge the latter axially in one direction along said feed shaft and into driving engagement with said first disk, an electrical switch in the circuit of said motor, a rotary switch closing member mounted on said camera and adapted when rotated to close said switch to energize said motor, a second gear splined on said feed shaft adjacent said second disk, clutch members on said second disk and said second gear adapted when engaged to connect said second gear and said feed shaft to said first gear and said motor so as to be driven thereby, a rockable lever connecting said second gear to said switch closing member so that axial movement of the latter in one direction serves to move said second gear axially to engage said clutch members, said axial movement also sliding said second disk axially along said shaft in the opposite direction to disengage said disks to disconnect said drum shaft from said drive means, a bell crank pivotally mounted on said camera and having one arm thereof connected to said switch closing member, a stop disk on said pull down shaft, and a blocking member formed on the other arm of said bell crank and adapted to be positioned in the path of said stop disk to prevent rotation of said pull down shaft, the axial movement of said switch closing member in said one direction serving to rock said bell crank to move said blocking member out of the path of said stop disk to permit the pull down shaft to be driven by the drive means.

12. In a motion picture camera, the combination with a sound drum shaft, means for feeding a film strip through said camera and across the exposure aperture thereof, drive means for said feeding means, of means for initially connecting said shaft to said drive means to bring said shaft up to speed, means movable in one direction to then disconnect said shaft from said drive means and for simultaneously connecting said feed means thereto to move said strip past said aperture to expose said strip, said last mentioned means being movable in the opposite direction to disconnect said feed means from said drive means at the completion of the picture taking operation, and means for engaging said feed means when disconnected from said drive means to arrest coasting of said feed means.

13. In a motion picture camera, the combination with a sound drum shaft, a film feed shaft, a pull down shaft cooperating with said feed shaft for moving a film strip through said camera, drive means for said feed and pull down shafts, of control means for said drive means for starting and stopping the latter, means adapted to connect said sound drum shaft to said drive means when the latter is started to bring said sound drum shaft up to speed, means actuated by said control means for subsequently disconnecting said sound drum shaft from and for connecting said feed and pull down shafts to said drive means to feed said strip, said last mentioned means being adapted to disconnect said feed and pull down shafts from said drive means to stop movement of said film strip, and means for braking said feed and pull down shafts when disconnected from said drive means to prevent coasting of said feed and pull down shafts.

14. In a motion picture camera, the combination with a sound drum shaft, a film feed shaft, a pull down shaft cooperating with said feed shaft for moving a film strip through said camera, drive means for said feed and pull down shafts, of control means for said drive means for starting and stopping the latter, means adapted to connect said sound drum shaft to said drive means when the latter is started to bring said sound drum shaft up to speed, means connecting said feed shaft to said control means so that movement of the latter in one direction serves to connect said feed and pull down shafts to said drive means to move said strip, said control means being movable in the opposite direction to actuate said connecting means to simultaneously disconnect both said feed and pull down shafts from said drive means to stop movement of said strip, and means operated by said control means when the latter is moved in said opposite direction to brake said pull down shaft to arrest rotation of the latter when disconnected from said drive means.

15. In a motion picture camera, the combination with a sound drum shaft, a film feed shaft, a pull down shaft cooperating with said feed shaft for moving a film strip through said camera, drive means for said feed and pull down shafts, of control means for said drive means for starting and stopping the latter, means adapted to connect said sound drum shaft to said drive means when the latter is started to bring said sound drum shaft up to speed, means connecting said feed shaft to said control means so that movement of the latter in one direction serves to connect said feed and pull down shafts to said drive means to move said strip, said control means being movable in the opposite direction to actuate said connecting means to simultaneously disconnect both said feed and pull down shafts from said drive means to stop movement of said strip, a stop disk mounted on said pull down shaft, a lug carried by said disk, and a stop lever connected to said control means and movable into the path of said lug to arrest rotation of said pull down shaft when said control means is moved in said opposite direction.

WILLIAM E. MERRIMAN.